United States Patent
Lai et al.

(10) Patent No.: US 6,752,619 B2
(45) Date of Patent: Jun. 22, 2004

(54) SERVO-DRIVEN CLAMPING UNIT FOR USE IN INJECTION MOLDING MACHINE

(75) Inventors: Ken-Hsien Lai, Taoyuan (TW); Wann-Fu Su, Hsinchu (TW); Kuo-Hsiung Lin, Miaoli Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 10/043,220

(22) Filed: Jan. 14, 2002

(65) Prior Publication Data

US 2003/0113400 A1 Jun. 19, 2003

(30) Foreign Application Priority Data

Dec. 19, 2001 (TW) ................................. 902222229 U

(51) Int. Cl.[7] .............................................. B29C 45/64
(52) U.S. Cl. .................................. 425/593; 425/451.6
(58) Field of Search ............................ 425/593, 451.6

(56) References Cited

U.S. PATENT DOCUMENTS

| | | | |
|---|---|---|---|
| 4,642,044 A | | 2/1987 | Ishikawa et al. |
| 5,190,714 A | * | 3/1993 | Reinhart ................ 425/593 |
| 6,004,490 A | * | 12/1999 | Tsai ........................ 425/593 |
| 6,050,804 A | * | 4/2000 | Tamaki et al. ......... 425/593 |
| 6,478,571 B1 | * | 11/2002 | Tsai et al. ............... 425/593 |

* cited by examiner

*Primary Examiner*—James P. Mackey
(74) *Attorney, Agent, or Firm*—Rabin & Berdo, P.C.

(57) ABSTRACT

A clamping unit for use in an injection molding machine is proposed, wherein a plurality of tie bars are symmetrically positioned and mounted in parallel to corners of a front platen and a rear platen, and a movable platen is movably sleeved about the tie bars and positioned between the front and rear platens. A servo-motor mounted on the rear platen acts as a power source for operating the clamping unit. A belt-gear mechanism associated with the servo-motor transmits torque force and turning speed provided from the servo-motor to a ball screw transmission mechanism connected to the belt-gear mechanism. The ball screw transmission mechanism converts the torque force into axial pushing force, so as to drive a toggle linkage mechanism that interconnects the rear platen and the movable platen, and move the movable platen along the tie bars for performing mold-opening and mold-clamping operations.

7 Claims, 5 Drawing Sheets

SERVO-DRIVEN CLAMPING UNIT FOR USE IN INJECTION MOLDING MACHINE

FIELD OF THE INVENTION

The present invention relates to servo-driven clamping units for use in injection molding machines, and more particularly, to a servo-driven clamping unit for use in an injection molding machine, which can facilitate precise positioning control of mold clamping, so as to improve stability and reliability for proceeding an injection molding process.

BACKGROUND OF INVENTION

Generally, a conventional injection molding machine adopts a hydraulic clamping mechanism for performing mold-opening and mold-closing operations, and is mainly composed of a machine base, a clamping unit, an injection unit and a hydraulic electric control system. FIG. 1 illustrates a conventional clamping unit 1, comprising: a front platen 3; a rear platen 4; a plurality of tie bars 2 symmetrically positioned and mounted in parallel to corners of the platens 3, 4 respectively; a movable platen 5 movably sleeved about the tie bars 2 between the front platen 3 and the rear platen 4; a hydraulic cylinder 6 mounted on the rear platen 4, for providing power to drive the movable platen 5 to move forward and in reverse along the tie bars 2; and a set of toggle linkage mechanisms 7 for interconnecting the rear platen 4 and the movable platen 5, and driven by the hydraulic cylinder 6 for inducing the back and forth movement of the movable platen 5. This conventional injection molding machine, however, is endowed with quite a few of drawbacks. First, the hydraulic clamping mechanism is not sensitive enough, thereby making the use of the hydraulic cylinder 6 for operating mold-opening or mold-clamping, not able to achieve high accuracy in mold positioning control. Further, hydraulic transmission may be affected by many factors. For example, variation of temperature or humidity in a working environment influences viscosity of hydraulic oil and frictional resistance of oil movement in the hydraulic cylinder 6; therefore, in practice, the hydraulic clamping mechanism is often defective with time-ineffective and energy-consuming problems. Moreover, the hydraulic cylinder 6 acting as a power source for mold clamping operation, is formed with a guide rod connected to one end of a connector device 8, whereas the other end of the connector device 8 is pivotally coupled to the toggle linkage mechanism 7. However, during element assemblage, a piston ring in the hydraulic cylinder 6 can bear with a certain extent of flexibility, thereby making the hydraulic cylinder 6 not possibly made in perfect association with the connector device 8; this therefore degrades the dimensional accuracy of fabricated products. In addition, this hydraulic system cannot efficiently control the entire progress of moving the guide rod of the hydraulic cylinder 6, so that precise positional control during mold-clamping operation is not possibly achieved by using the hydraulic system.

U.S. Pat. No. 4,642,044 discloses a conventional servo-driven clamping unit 1' for use in an injection molding machine disclosed, so as to solve the foregoing problem of positioning control, as shown in FIG. 2. The clamping unit 1' adopts a servo-motor 9 to drive mold-opening and mold-closing operations, wherein the servomotor 9 is mounted on a rear platen 4', and turns to generated torque force that is transmitted through a shaft connector 10 associated with the servo-motor 9, an idler gear 11 and a follower gear 12 engaged with the idler. When the follower gear 12 is driven to rotate, a ball screw 14 coupled to the follower gear 12 by means of a guide device 13 can be induced to move forward and backward along a horizontal direction, allowing the torque force to be converted into axial pushing force. The ball screw 14 is further connected to a toggle linkage mechanism 7' by means of a connector device 8', wherein the toggle linkage mechanism 7' interconnects the rear platen 4' and a movable platen 5'. When the ball screw 14 moves forward, the toggle linkage mechanism 7' is driven by the connector device 8' to move the movable platen 5' forward along tie bars 2' and toward a front platen 3', until mold halves being coupled together, so that mold-clamping operation is completed, and the servo-motor 9 stops operating at this time. For opening the mold halves, the servo-motor 9 turns at an opposite direction, allowing the ball screw 14 to move backward and generate a backward pulling force to move the movable platen 5' away from the front platen 3', so that the coupled mold halves can be separated apart from each other, and mold-opening operation is accomplished.

However, the foregoing servo-driven clamping unit 1' has the following drawbacks. First, power transmission through the idler gear 11 and the follower gear 12 cannot be perfectly performed due to dimensional errors made during gear fabrication; this undesirably results in energy loss and also inaccuracy of positioning control during mold-clamping operation. And, the gear transmission system is further defective for noise production, frequent requirement of element lubrication, and reduction in usage lifetime of elements. Moreover, the ball screw 14 is assembled with the connected device 8' by means of screws, and thereby easily applies unbalanced force to the connected device 8'; this may lead to rotational deviation of the ball screw 14 and detrimentally affect lifetime of the ball screw 14. Furthermore, two ends of the ball screw 14 are not balanced supported by only one guide device 13, and thus rigidity and stability of the ball screw 14 are not strong enough in operation, which in turn deteriorates the accuracy of positioning control during mold-clamping. In addition, the toggle linkage mechanism 7' used in the conventional servo-driven clamping unit 1' is relatively complicated in structure; this increases complexity in fabrication, and also makes the mold-opening or mold-clamping operation not time-effective to implement.

SUMMARY OF THE INVENTION

A primary objective of the present invention is to provide a servo-driven clamping unit for use in an injection molding machine, in which internal elements of the clamping unit are precisely engaged with each other for accurate power transmission and mold-clamping positioning.

Another objective of the invention is to provide a servo-driven clamping unit for use in an injection molding machine, in which two ends of a ball screw are well supported by bearing devices, allowing the ball screw to be accurately assembled in the clamping unit, so as to improve rigidity and stability of the ball screw in operation.

A further objective of the invention is to provide a servo-driven clamping unit for use in an injection molding machine, in which a toggle linkage mechanism is structurally simplified in element linkage, so as to enhance mold-clamping force.

In accordance with the foregoing and other objectives, the present invention proposes a servo-driven clamping unit for use in an injection molding machine, comprising: a plurality of tie bars symmetrically positioned and mounted in parallel to corners of a front platen and a rear platen; a movable platen movably sleeved about the tie bars and positioned between the front and rear platens; a servo-motor mounted on the rear platen, for providing power for operating the clamping unit; a belt-gear mechanism associated with the servo-motor, for transmitting torque force and turning speed provided from the servo-motor; a ball screw transmission mechanism including a ball screw and a guide device connected to the belt-gear mechanism, for converting the torque force transmitted from the belt-gear mechanism into axial pushing force, wherein the guide device is formed with a threaded hole for allowing the ball screw to be inserted through the threaded hole; a toggle linkage mechanism for interconnecting the rear platen and the movable platen, and bearing the axial pushing force from the ball screw transmission mechanism so as to drive the movable platen to move along the tie bars.

The invention is characterized of using the belt-gear mechanism, including an active gear, a passive gear and a belt; which belt is a timing belt, and is precisely toothed and engaged with the active gear and the passive gear. This perfect dimensional engagement therefore allows accurate power transmission, and eliminates the drawback of energy loss caused by incomplete engagement between conventional gears due to dimensional inaccuracy made in fabrication. Therefore, the use of the belt-gear mechanism is advantageous of reducing noise generation, efficiently transmitting mold-clamping force, as well as precisely controlling mold-clamping positioning.

In addition, the guide device of the ball screw transmission mechanism is sleeved about one end of the ball screw, and a connector device is affixed to the other end of the ball screw, with at least a bearing device being peripherally formed around the guide device and the connect device, respectively. This makes two ends of the ball screw well supported by the bearing devices, allowing the ball screw to be accurately assembled in the clamping unit, so as to improve rigidity and stability of the ball screw in operation. The guide device is further coupled to the passive gear of the belt-gear mechanism, and driven to rotate by the servo-motor in association with the belt-gear mechanism, so as to induce the ball screw to move forward and backward, and convert the torque force from the servo-motor into the axial pushing force, which is in turn transmitted to the toggle linkage mechanism for driving the movable platen to move along the tie bars.

BRIEF DESCRIPTION OF THE DRAWINGS

The present invention can be more fully understood by reading the following detailed description of the preferred embodiments, with reference made to the accompanying drawings wherein.

DETAILED DESCRIPTION OF THE PREFERRED EMBODIMENT

Figure 3:
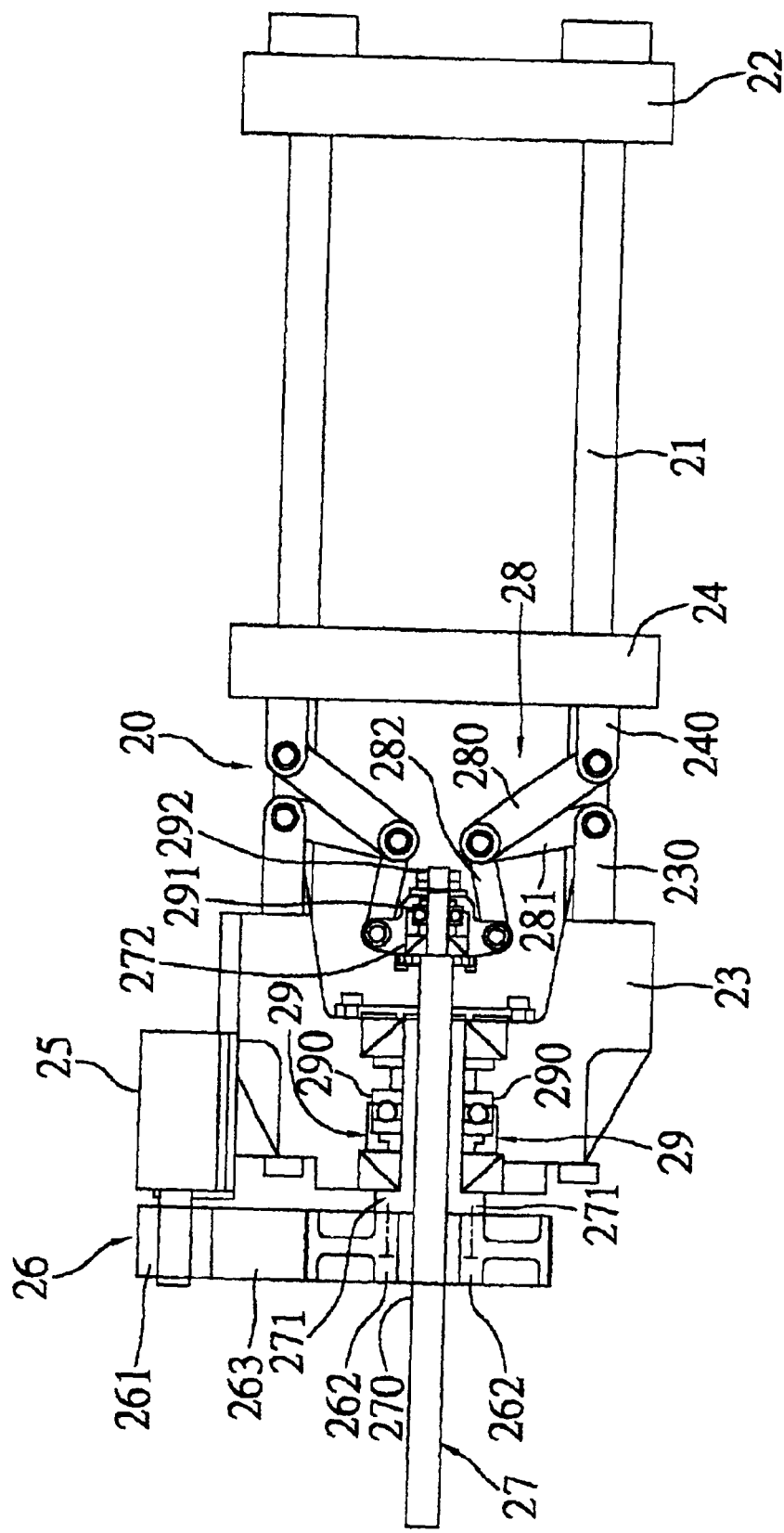
FIG. 3 is a schematic diagram of a servo-driven clamping unit for use in an injection molding machine of the invention.

Referring to FIG. 3, it illustrates a servo-driven clamping unit 20 for use in an injection molding machine of the invention, comprising: a front platen 22; a rear platen 23; a plurality of tie bars 21 symmetrically positioned and mounted in parallel to corners of the platens 22, 23 respectively; a movable platen 24 sleeved about the tie bars 21 between the front platen 22 and the rear platen 23, and capable of being moved along the tie bars 21; a servo-motor 25 acting as a power source for the clamping unit 20; a timing belt-gear mechanism 26 for transmitting torque force and turning speed provided from the servo-motor 25; a ball screw transmission mechanism 27 for converting the torque force transmitted from the timing belt-gear mechanism 26 into axial pushing force; a toggle linkage mechanism 28 for interconnecting the rear platen 23 and the movable platen 24, and bearing the pushing force from the ball screw transmission mechanism 27 so as to drive the movable platen 24 to move along the tie bars 21 during mold-clamping operation; and a bearing mechanism 29 having at least a front bearing device 291 sleeved about a ball screw 270 of the ball screw transmission mechanism 27 at a front end where the ball screw 270 is connected to the toggle linkage mechanism 28, and at least a rear bearing device 290 peripherally formed around a guide nut 271 coupled to a rear end of the ball screw 270.

The clamping unit 20 of the invention adopts the servo-motor 25 that is mounted on the rear platen 23, for providing power for operating the clamping unit 20. The servo-motor 25 drives the timing belt-gear mechanism 26 for power transmission, wherein the timing belt-gear mechanism 26 includes an active gear 261, a passive gear 262 and a timing belt 263. The active gear 261 is closely toothed with the timing belt 263 in a manner as to precisely transmit turning speed and torque force provided from the servo-motor 25 to the passive gear 262. The dimensional complete engagement among the active gear 261, the timing belt 263 and the passive gear 262 in sequence allows efficient power transmission, without generating any positioning error and power loss during transmission due to dimensionally inaccurate engagement. Then, the turning speed and torque force from the servo-motor 25 is in turn transmitted through the passive gear 262 to the ball screw transmission mechanism 27 associated with the passive gear 262. The ball screw transmission mechanism 27 includes the ball screw 270, the guide nut 271 coupled to the rear end of the ball screw 270, and a connector device 272 affixed to the front end of the ball screw 270. The guide nut 271 is formed with a central threaded hole, for allowing the ball screw 270 to penetrate through the threaded hole. With the guide nut 271 being further associated with the passive gear 262, when the guide nut 271 is driven to rotate by the passive gear 262, the ball screw 270 can be in turn induced to move forward or backward in response to the turning direction of the servo-motor 25, so that the torque force outputted from the servo-motor 25 is converted into axial pushing force, which is then transmitted through the connector device 272 to the toggle linkage mechanism 28.

The toggle linkage mechanism 28 includes a pair of front arms 280 symmetrically positioned, and each pivotally linked to a movable-platen arm 240 of the movable platen 24; a pair of rear arms 281 each pivotally linked to a rear-platen arm 230 of the rear platen 23; a pair of driving arms 282, each of which driving arms 282 has one end thereof being pivotally connected to the joint of the front arm 280 and the rear arm 281, and the other end of the driving arm 282 being pivotally associated with the connector device 272 that is fixedly mounted at the front end of the ball screw 270. During mold-clamping operation, when the ball screw 270 is driven to move forward, axial pushing force is generated and transmitted through the toggle linkage mechanism 28 to drive the movable platen 24 to horizontally move along the tie bars 21 toward the front platen 22, so as to allow mold halves (not shown) to come into contact with each other between the movable platen 24 and the front platen 22.

The connector device 272 coupled to the ball screw 270, is further surrounded by at least a front bearing device 291 having a bearing for supporting and positioning purposes. A nut 292 is adopted at the front end of the ball screw 270 for securely affixing the connector device 272 to the ball screw 270, allowing the ball screw 270 and the connector device 272 to be integrally operated as a whole. And, the guide nut 271 sleeved about the rear end of the ball screw 270, is also peripherally formed with at least a rear bearing device 290 that has a bearing with supporting and positioning functions. With this arrangement, two ends of the ball screw 270 are both well supported, making rigidity and stability of the ball screw 270 both enhanced during operation; this can prevent the occurrence of rotational deviation of the ball screw 270, and therefore reduce undesirable damage to but increase usage lifetime of the ball screw 270.

Figure 4:
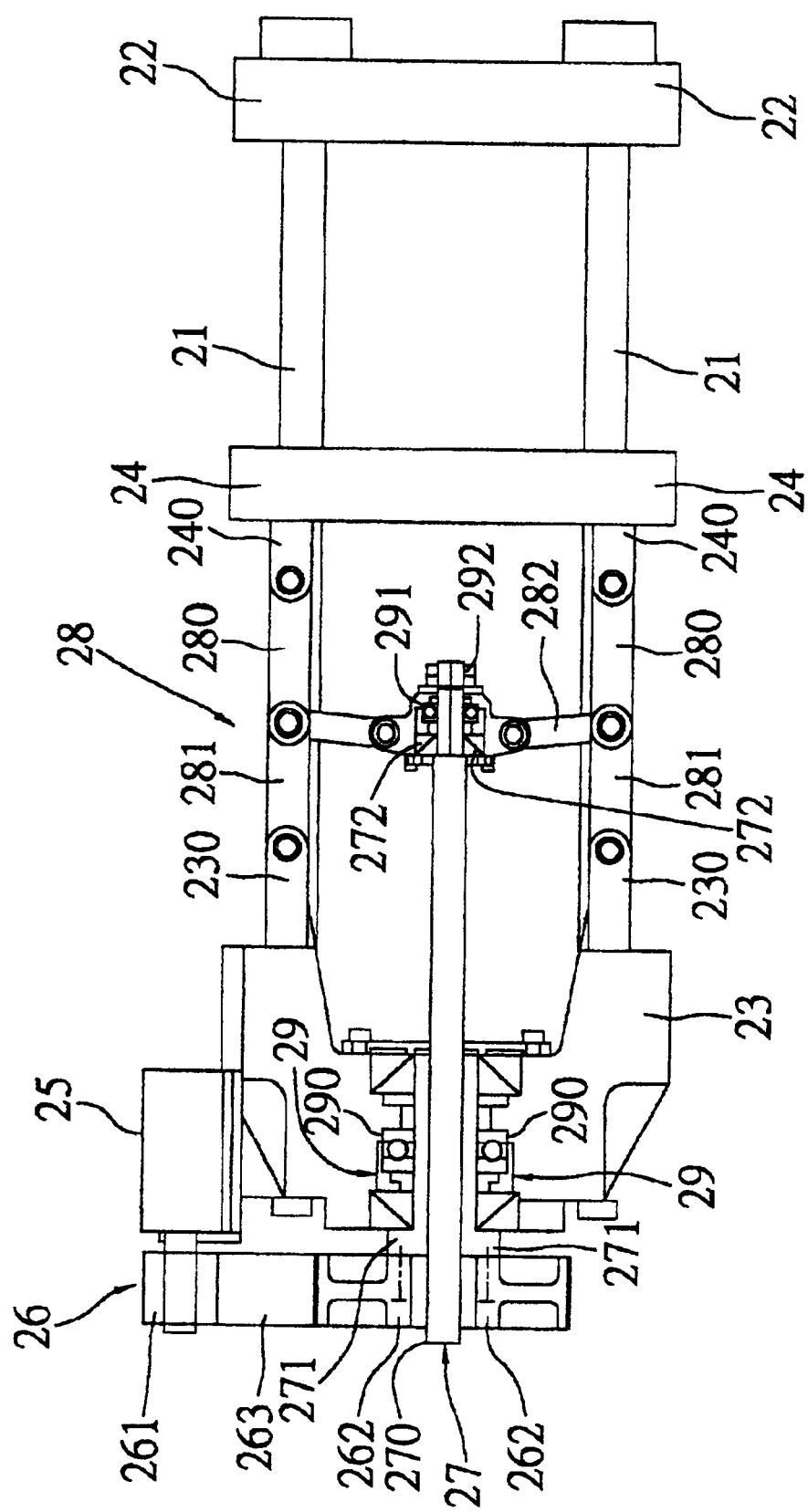
FIG. 4 is a schematic diagram of a servo-driven clamping unit for use in an injection molding machine of the invention during mold-closing operation.

Referring to FIG. 4, it illustrates the servo-driven clamping unit for use in an injection molding machine of the invention during mold-closing operation. First, a servo-motor 25 turns to output torque force, which is then transmitted through a timing belt-gear mechanism 26 to a ball screw transmission mechanism 27. It is achieved in a manner that, an active gear 261 coupled to a shaft of the servo-motor 25 is closed engaged with a timing belt 263, so as to precisely transmit the torque force and turning speed provided from the servo-motor 25 to a passive gear 262. Since the timing belt 263 is completely toothed in dimension with the active gear 261 and the passive gear 262 respectively, it can prevent the occurrence of rotational deviation caused by dimensionally inaccurate engagement, and also reduce noise generation during power transmission, thereby without the need of using lubricant for achieving smooth transmission. This therefore allows the outputted torque force and turning speed from the servo-motor 25 to be accurately transmitted to the ball screw transmission mechanism 27 in operation.

A guide nut 271 of the ball screw transmission mechanism 27 is coupled to the passive gear 262, so that the torque force generated from the servo-motor 25 can be transmitted through the active gear 261 and the passive gear 262 to the guide nut 271, for driving the guide nut 271 to rotate, and in turn inducing the horizontal movement of a ball screw 270 that is associated at its rear end with the guide nut 271. This makes the torque force from the servo-motor 25 readily converted to axial pushing force by the ball screw transmission mechanism 27.

The ball screw 270 is further affixed at its front end with a connector device 272, which is in sequence pivotally linked with driving arms 282. The foregoing induced axial pushing force can be transmitted from the ball screw 270 to the driving arms 282; which axial pushing force then acts on front and rear arms 280, 281 that are pivotally connected to the driving arms 282, and diverts to form vertical force and horizontal force. The horizontal force drives the front arms 280 to horizontally move a movable platen 24 in pivotal association with the front arms 280; whereas the vertical force allows vertical relative movement of the front and rear arms 280, 281 to stretch flat or fold back the arms 280, 281. As shown in FIG. 4, when the ball screw 270 moves forward, the driving arms 282 are then driven to expand out the front and rear arms 280, 281, allowing a rear mold (not shown) fitted on the movable platen 24 to move rightward along tie bars 21 until reaching a front mold (not shown) mounted on a front platen 22, so that the front and rear molds are coupled together, and the mold-clamping operation is accomplished by the clamping unit 20.

Figure 5:
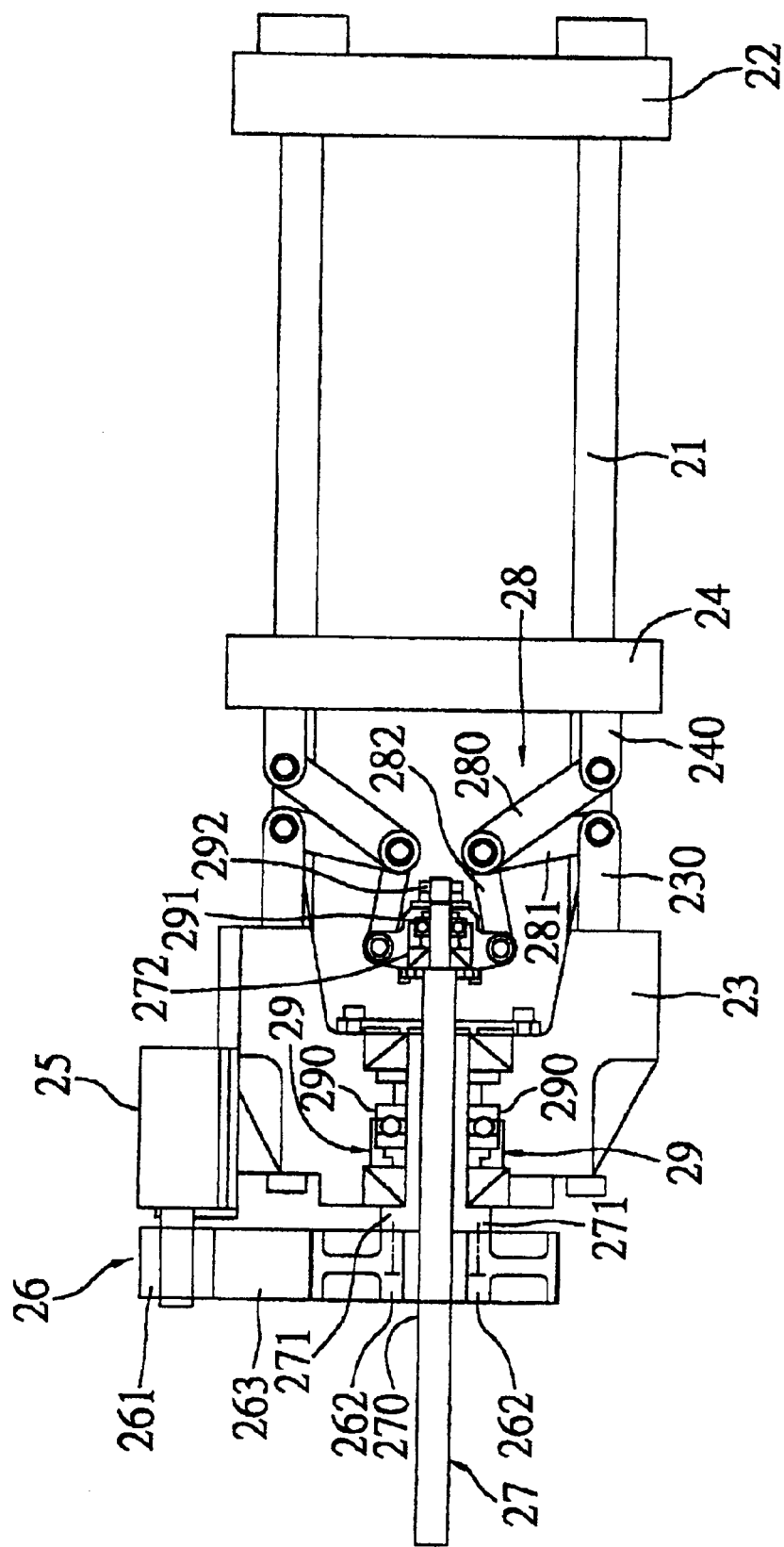
FIG. 5 is schematic diagram of a servo-driven clamping unit for use in an injection molding machine of the invention during mold-opening operation.

Referring to FIG. 5, it illustrates the servo-driven clamping unit for use in an injection molding machine of the invention during mold-opening operation. When the servo-motor 25 turns at an opposite direct with respect to the mold-clamping operation, the ball screw 270 is then driven by the servo-motor 25 to move backward, allowing the driving arms 282 associated with the connector device 272 to fold back the front and rear arms 280, 281. This in turn makes the movable paten 24 pulled by the front arms 280 to move leftward, so as to separate the rear mold (not shown) attached to the movable platen 24 apart from the front mold (not shown) mounted on the front platen 22, thereby completing the mold-opening operation through the use of the clamping unit 20.

Figure 1:
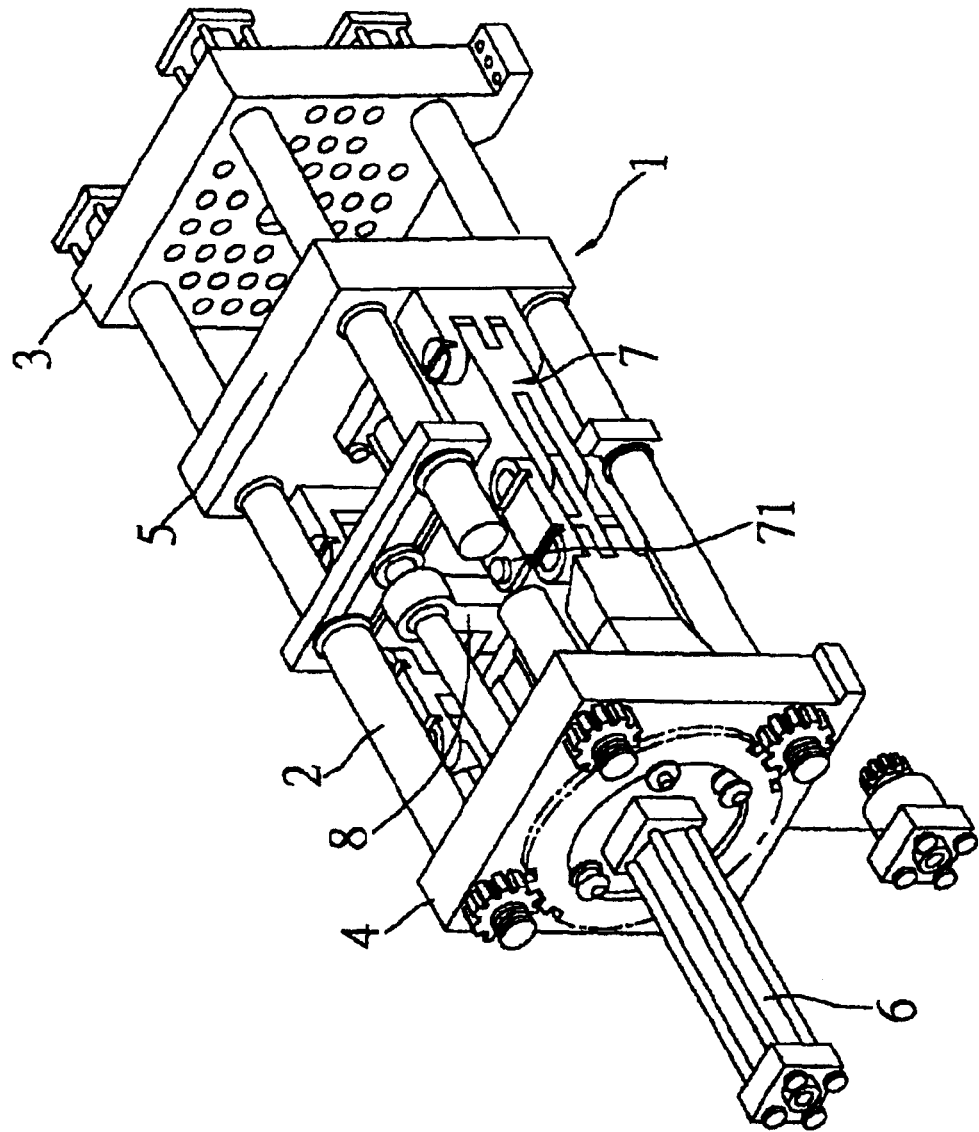
FIG. 1 (PRIOR ART) is a perspective view of a conventional clamping unit for use in an injection molding machine.
Figure 2:
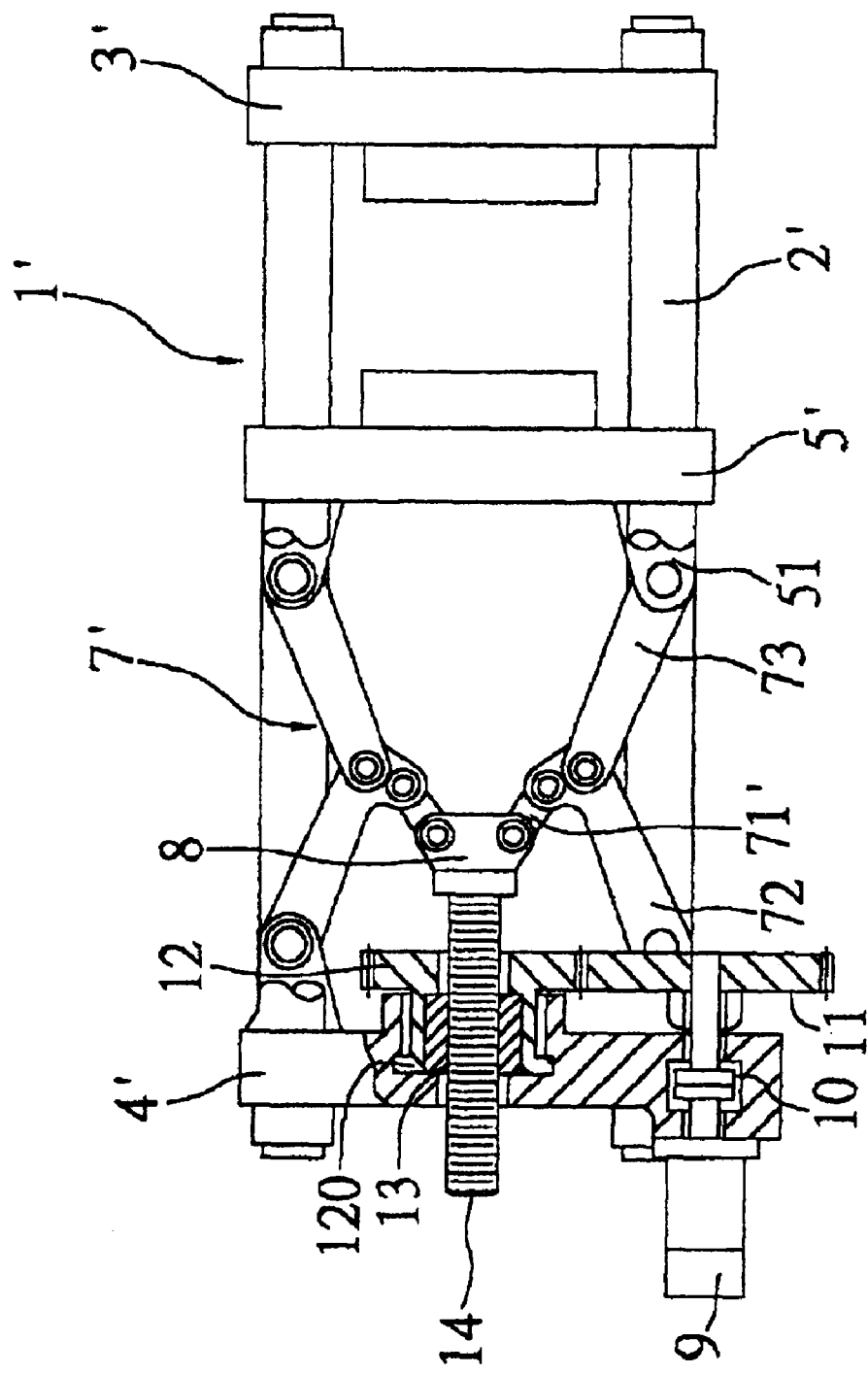
FIG. 2 (PRIOR ART) is a schematic diagram of a conventional servo-driven clamping unit for use in an injection molding machine.

In conclusion, the use of the clamping unit 20 of the invention for performing mold-opening and mold-closing operations is endowed with several advantages. First, turning speed and torque force generated from the servo-motor 25 can be surely and efficiently transmitted through the timing belt-gear mechanism 26 to the ball screw 270, without causing rotational deviation due to dimensionally inaccurate engagement between internal elements of the clamping unit 20 during power transmission. Therefore, the ball screw 270 can precisely move to predetermined positions for mold-clamping, and in turn drive the connector device 272 affixed at the front end of the ball screw 270 to move the toggle linkage mechanism 28, allowing the driving arms 282 to be positioned vertically relative to the horizontally-arranged front and rear arms 280, 281 at mold-clamping status; this can provide maximum axial clamping force to move the movable platen 24 and support mold halves to be firmly coupled together. Moreover, the toggle linkage mechanism 28 is simply composed of the driving arms 282, and the front and rear arms 280, 281. The driving arms 282 are each pivotally linked to the connector device 272 and the joint of the front and rear arms 280, 281; whereas the front and rear arms 280, 281 are pivotally connected to the movable platen 24 and the rear platen 23, respectively. Therefore, in overall, the toggle linkage mechanism 28 is structurally more simplified than a toggle linkage mechanism used in a conventional clamping unit shown in FIG. 2. In addition, the ball screw 270 drives the driving arms 282 to move the joints of the front and rear arms 280, 281 along a horizontal direction; this not only emphasizes the acceleration and deceleration in the movement of the movable platen 24 driven by the ball screw 270, but also helps reduce time consumption for operating the clamping unit 20 for use in an injection molding machine of the invention.

The invention has been described using exemplary preferred embodiments. However, it is to be understood that the scope of the invention is not limited to the disclosed embodiments. On the contrary, it is intended to cover various modifications and similar arrangements. For example, besides the side edges, the connecting portion can be alternatively formed at other positions on the covering module plate, such as a position between two neighboring chips. The scope of the claims, therefore, should be accorded the broadest interpretation so as to encompass all such modifications and similar arrangements.

What is claimed is:

1. A clamping unit for use in an injection molding machine, comprising:

a plurality of tie bars symmetrically positioned and mounted in parallel to corners of a front platen and a rear platen;

a movable platen movably sleeved about the tie bars and positioned between the front and rear platens;

a servo-motor mounted on the rear platen, for providing power for operating the clamping unit;

a belt-gear mechanism associated with the servo-motor, for transmitting torque force and turning speed provided from the servo-motor;

a ball screw transmission mechanism including a ball screw a connector device, and a rotatable guide device connected to the belt-gear mechanism, for converting the torque force transmitted from the belt-gear mechanism into an axial pushing force, wherein the guide device is formed with a threaded hole for allowing the ball screw to be inserted through the threaded hole, the guide device being sleeved about one end of the ball screw so that when the guide device is rotated by the belt-gear mechanism, the ball screw is caused to move in an axial direction, the connector device being affixed to the other end of the ball screw, the connector device being peripherally formed with at least a front bearing device, and the guide device being surrounded by at least a rear bearing device, so as to allow two ends of the ball screw to be firmly supported for stable operation; and a toggle linkage mechanism for interconnecting the rear platen and the movable platen, and bearing the axial pushing force from the ball screw transmission mechanism so as to drive the movable platen to move along the tie bars.

2. The clamping unit of claim 1, wherein the belt-gear mechanism includes an active gear, a passive gear and a belt.

3. The clamping unit of claim 2, wherein the guide device of the ball screw transmission mechanism is coupled to the passive gear of the belt-gear mechanism, and driven to rotate by the servo-motor in association with the belt-gear mechanism, so as to induce the ball screw to move forward and backward, and convert the torque force from the servo-motor into the axial pushing force, which is in turn transmitted to the toggle linkage mechanism for driving the movable platen to move along the tie bars.

4. The clamping unit of claim 2, wherein the belt of the belt-gear mechanism is a timing belt, which is precisely toothed and engaged with the active gear and the passive gear for power transmission.

5. The clamping unit of claim 1, wherein the toggle linkage mechanism includes driving arms having one ends thereof pivotally connected to the ball screw transmission mechanism, and the other ends thereof pivotally linked to joints of front arms and rear arms, which front and rear arms are pivotally associated with the movable platen and the rear platen, respectively.

6. The clamping unit of claim 1, wherein the front and rear bearing devices each is formed with a bearing.

7. The clamping unit of claim 1, wherein the ball screw is fixedly mounted with the connecter device by means of a nut.

* * * * *